United States Patent
Maupin

(10) Patent No.: US 7,620,792 B2
(45) Date of Patent: Nov. 17, 2009

(54) PROCESSING SYSTEM, MEMORY AND METHODS FOR USE THEREWITH

(75) Inventor: Patrick Evan Maupin, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 530 days.

(21) Appl. No.: 11/507,650

(22) Filed: Aug. 21, 2006

(65) Prior Publication Data

US 2008/0046677 A1   Feb. 21, 2008

(51) Int. Cl.
*G06F 12/02* (2006.01)

(52) U.S. Cl. .................. 711/202; 714/719; 714/721

(58) Field of Classification Search .............. None
See application file for complete search history.

(56) References Cited

U.S. PATENT DOCUMENTS

| 5,923,674 A * | 7/1999 | Nakadai ............... 714/721 |
| 6,393,543 B1 * | 5/2002 | Vilkov et al. ........... 711/202 |
| 6,415,030 B2 * | 7/2002 | Matsui et al. ........... 380/37 |

\* cited by examiner

*Primary Examiner*—Reginald G Bragdon
*Assistant Examiner*—Baboucarr Faal

(57) ABSTRACT

A memory includes an array of memory cells arranged in a plurality of rows and a plurality of columns. An address transform module receives a logical address including a logical column address and logical row address, and transforms the logical address into a physical address having a physical row address and a physical column address. An address decoder module accesses an individual memory cell of the array of memory cells based on the physical address.

43 Claims, 14 Drawing Sheets

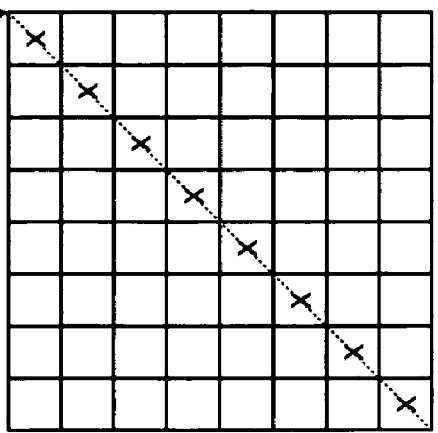
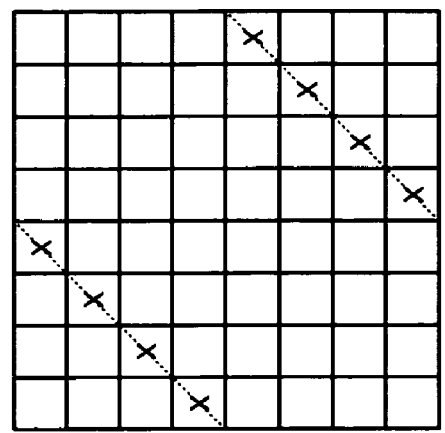
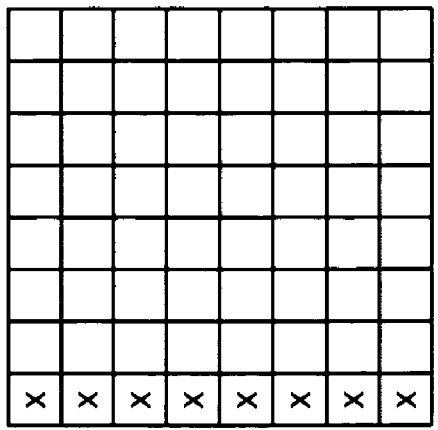
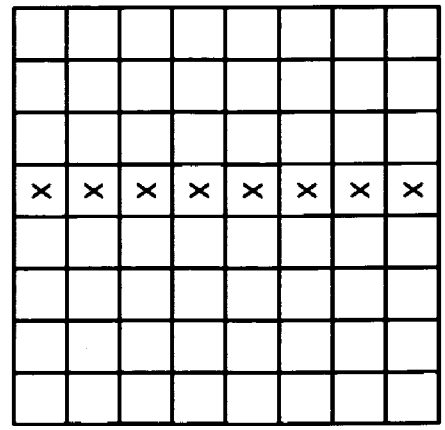
FIG. 9
FIG. 10

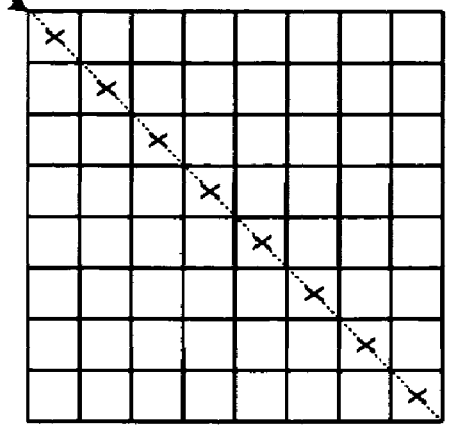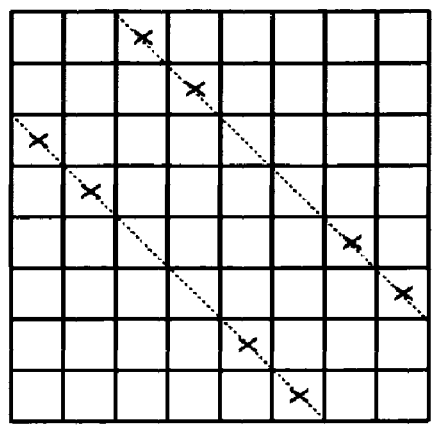
FIG. 13
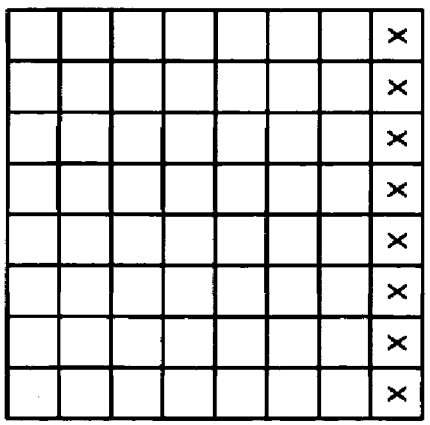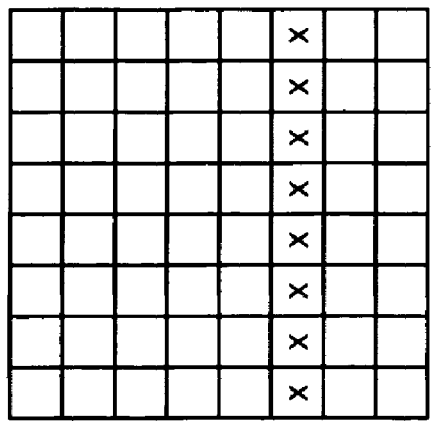
FIG. 14

PROCESSING SYSTEM, MEMORY AND METHODS FOR USE THEREWITH

CROSS REFERENCE TO RELATED PATENTS

Not applicable

BACKGROUND OF THE INVENTION

1. Technical Field of the Invention

The present invention relates to memory devices, address decoders and related methods.

2. Description of Related Art

As is known, integrated circuits are used in a wide variety of electronic equipment, including portable, or handheld, devices. Such handheld devices include personal digital assistants (PDA), compact disk (CD) players, MP3 players, digital video disk (DVD) players, AM/FM radios, pagers, cellular telephones, computer memory extensions (commonly referred to as thumb drives), etc. Each of these handheld devices includes one or more integrated circuits to provide the functionality of the device. As an example, a handheld audio player may include multiple integrated circuits to support the decoding and playback of stored audio files in order to produce an audio output that is delivered to the user through speakers, headphones or the like. Such integrated circuits include processing devices that execute a program that includes a sequence of instructions and/or data that are stored in a memory device such as a random access memory (RAM) or a one-time writable memory such as read-only memory (ROM).

When electronic devices are constructed, it is desirable to perform operational tests of components such as integrated circuits prior to assembly. Once an integrated circuit is mounted on a printed circuit board, if a defect is found, it can be costly and time prohibitive to remove the device from the board to install a new component. One-time writeable memory devices provide a challenge to test. Certain tests can be performed to test the integrity of the chip, however, a test of the read and write operations of the device require the memory cells to be burned (programmed) in a non-reversible fashion. Tests that are performed, prior to programming, must be limited in nature. In particular, the amount of memory tested must be limited to leave adequate space for programming.

One solution to this problem is to test a single row or column of a ROM prior to programming. A row or column is written with a test pattern and then read to determine if the memory device is properly functioning. If the device passes, the remaining memory cells are programmed after the device is installed. However, errors present in other portions of the memory cannot be detected.

A need exists for a memory device, particularly a one-time writable memory, that can be effectively tested and efficiently implemented in an integrated circuit.

BRIEF DESCRIPTION OF THE SEVERAL VIEWS OF THE DRAWINGS

FIG. 9 presents a pictorial diagram representation of the translation of a column of physical addresses to corresponding logical addresses in accordance with an embodiment of the present invention.

FIG. 10 presents a pictorial diagram representation of the translation of a column of physical addresses to corresponding logical addresses in accordance with an embodiment of the present invention.

FIG. 13 presents a pictorial diagram representation of the translation of a row of physical addresses to corresponding logical addresses in accordance with an embodiment of the present invention.

FIG. 14 presents a pictorial diagram representation of the translation of a row of physical addresses to corresponding logical addresses in accordance with an embodiment of the present invention.

DETAILED DESCRIPTION OF THE INVENTION INCLUDING THE PRESENTLY PREFERRED EMBODIMENTS

Various embodiments of the present invention include a memory device that transforms logical addresses to physical addresses. This simplifies testing of multiple rows and columns of the device, while not interfering with the normal column and row decoding. This advantage and other advantages over the prior art will be evident in light of the many functions and features described herein.

Figure 1:
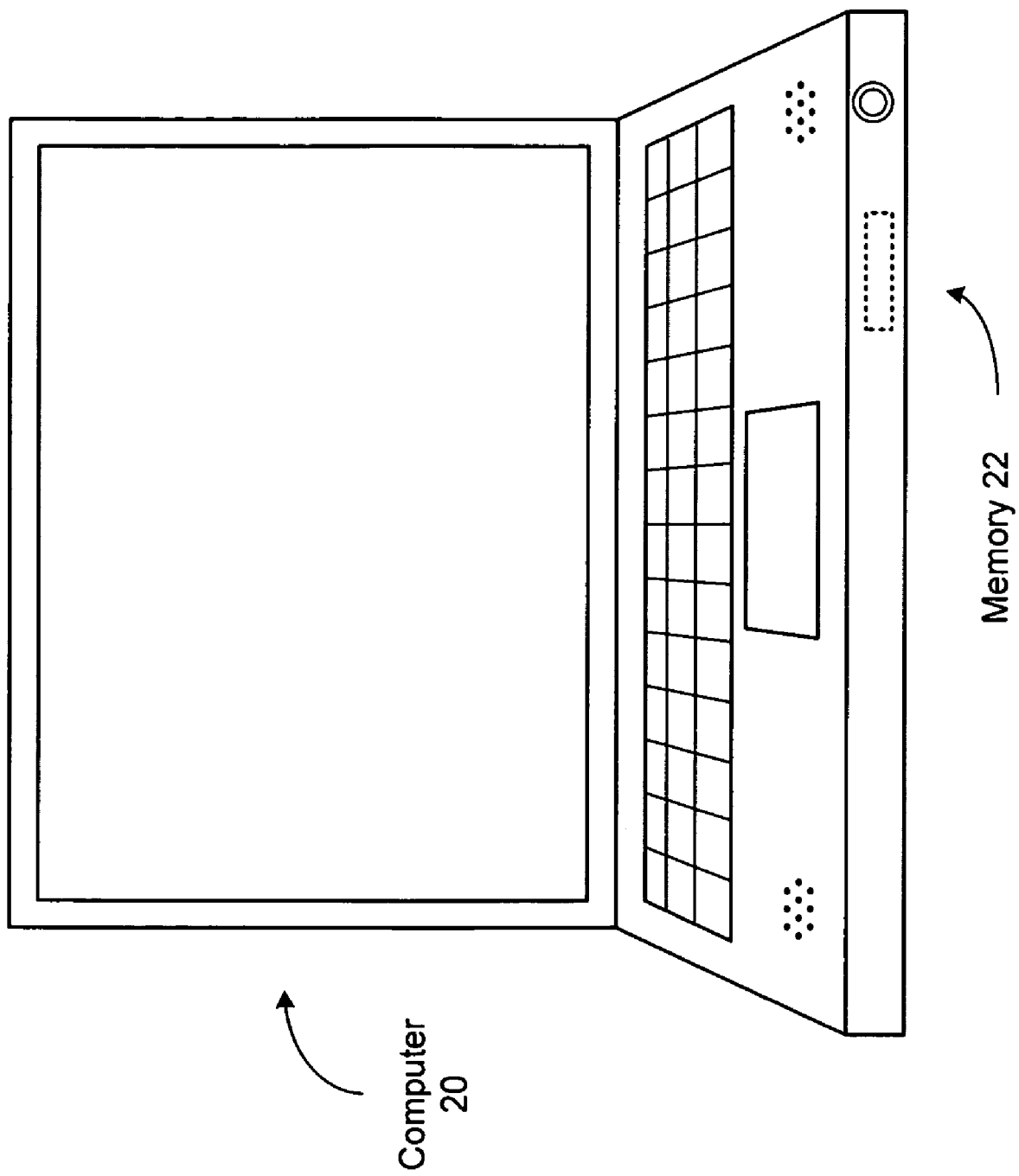
FIG. 1 presents pictorial diagram representation of a computer in accordance with an embodiment of the present invention.

FIG. 1 presents a pictorial view of a computer in accordance with an embodiment of the present invention. In particular, computer 20 includes memory 22 for storing operational instructions of a processor, and data. Examples of such operational instructions and data include application programs, system programs and utilities, device drivers, registries, buffers, stacks, application files, program files, cache memories, along with other programs files, instructions, and data used in the operation of computer 20.

Memory 22 includes various features and functions in accordance with the present invention that will be described in conjunction with the figures that follow.

Figure 2:
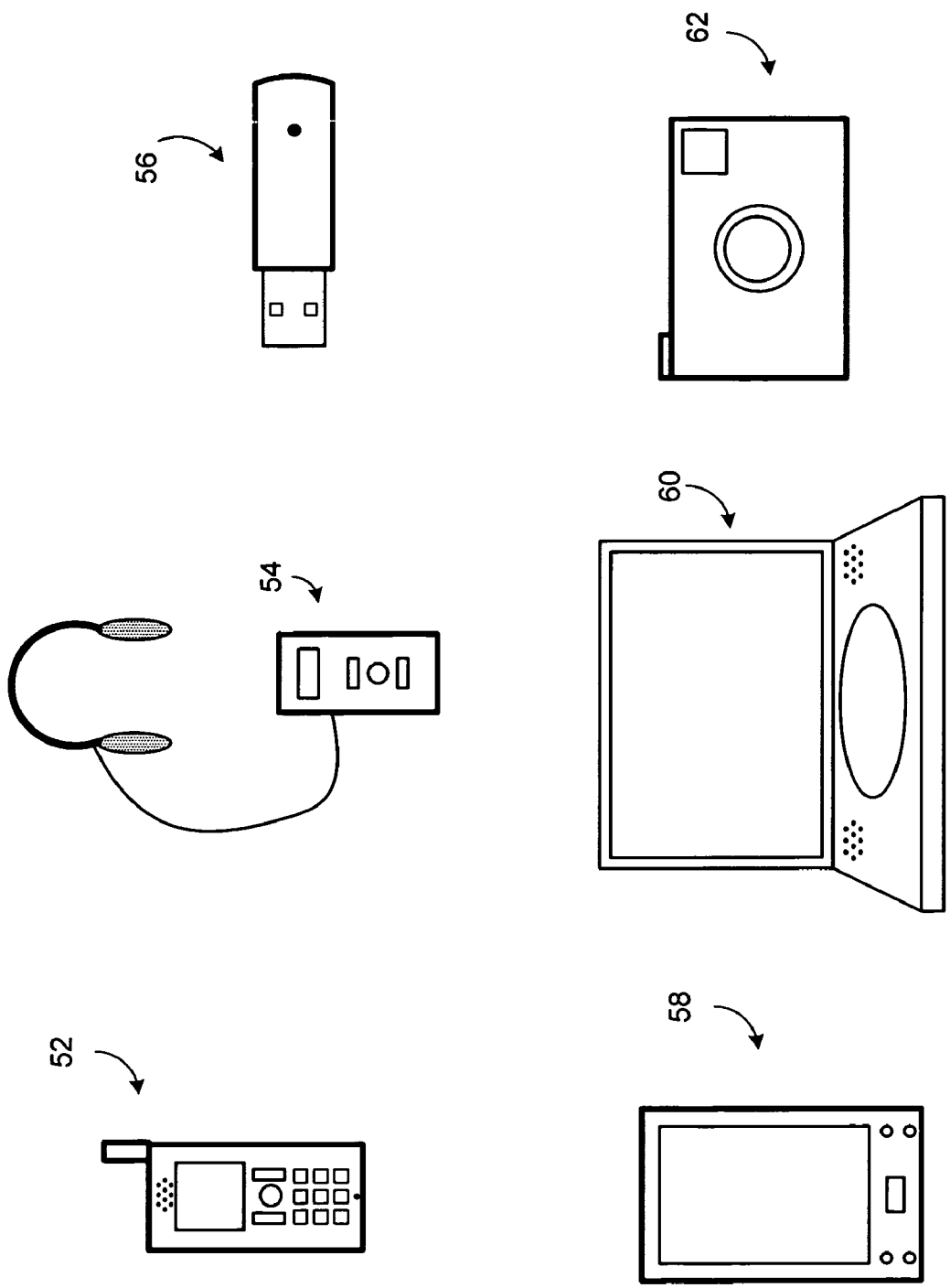
FIG. 2 presents pictorial diagrams of various electronic devices in accordance with an embodiment of the present invention.

FIG. 2 presents pictorial diagrams of various electronic devices in accordance with an embodiment of the present invention. While the memory 22 has been described in conjunction with its use in a computer such as computer 20, memory 22 may likewise be incorporated in a cellphone 52, handheld audio device 54 for replaying stored audio files, universal serial bus (USB) device 56, personal digital assistant 58, digital video disk player 60, digital camera 62, along with other electronic devices that use one or more memory devices.

Figure 3:
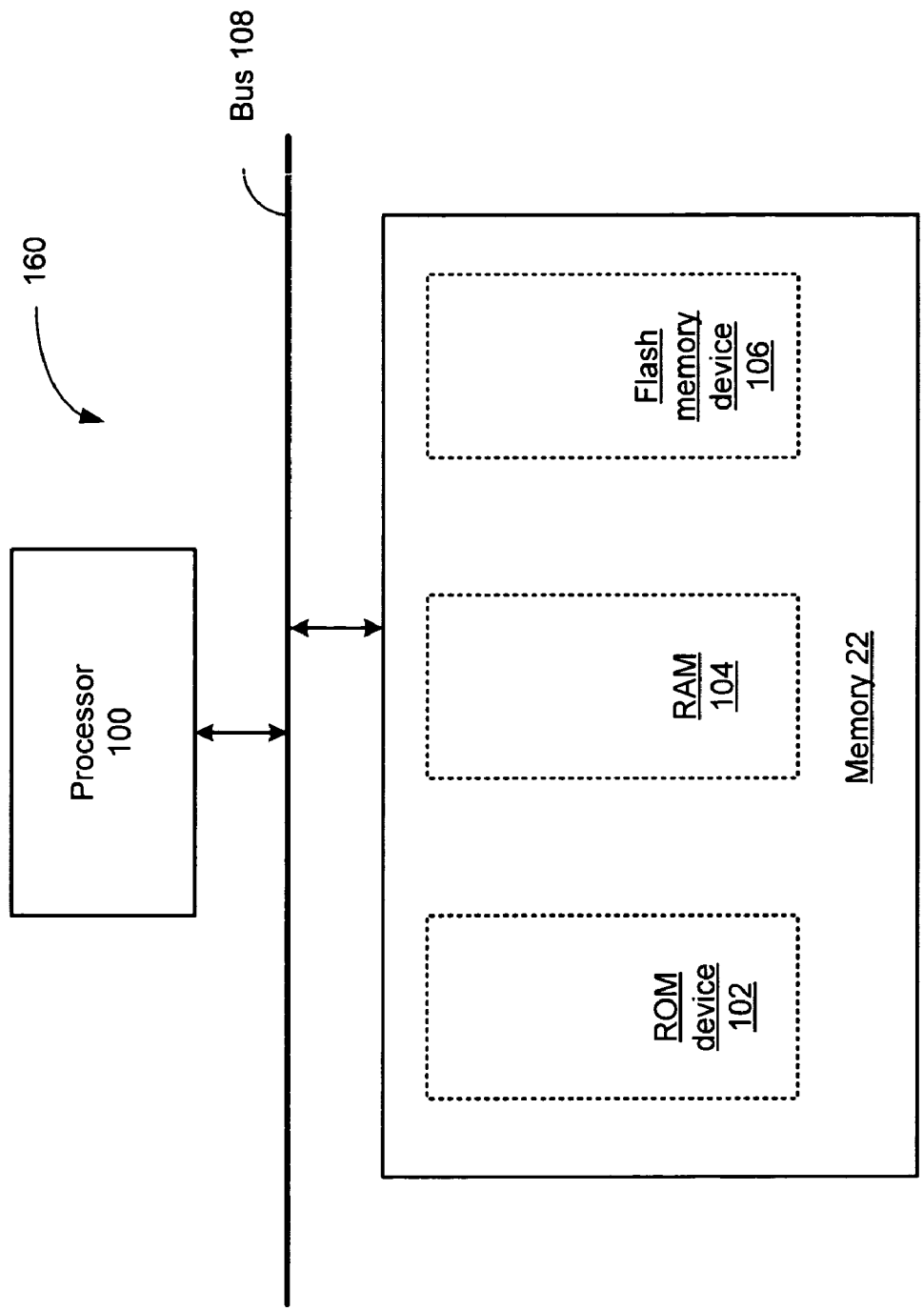
FIG. 3 presents a schematic/block diagram representation of a processing system 160 in accordance with an embodiment of the present invention.

FIG. 3 presents a schematic/block diagram representation of a processing system 160 in accordance with an embodiment of the present invention. In particular, a processing system 160 is presented that includes a processing module 100 that is coupled to a memory 22 via bus 108. Memory 22 optionally includes read only memory (ROM) device 102, random access memory (RAM) 104, and/or flash memory device 106.

Processing module 100 can be implemented using a microprocessor, micro-controller, digital signal processor, micro-computer, central processing unit, field programmable gate array, programmable logic device, state machine, logic circuitry, analog circuitry, digital circuitry, and/or any device that manipulates signals (analog and/or digital) based on operational instructions. The memory 22 may include a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 100 implements one or more of its functions via a state machine, analog circuitry, digital circuitry, and/or logic circuitry, the memory 22 storing the corresponding operational instructions may be embedded within, or external to, the circuitry comprising the state machine, analog circuitry, digital circuitry, and/or logic circuitry.

Memory 22 includes novel features as will be described in further detail in conjunction with the figures that follow.

Figure 4:
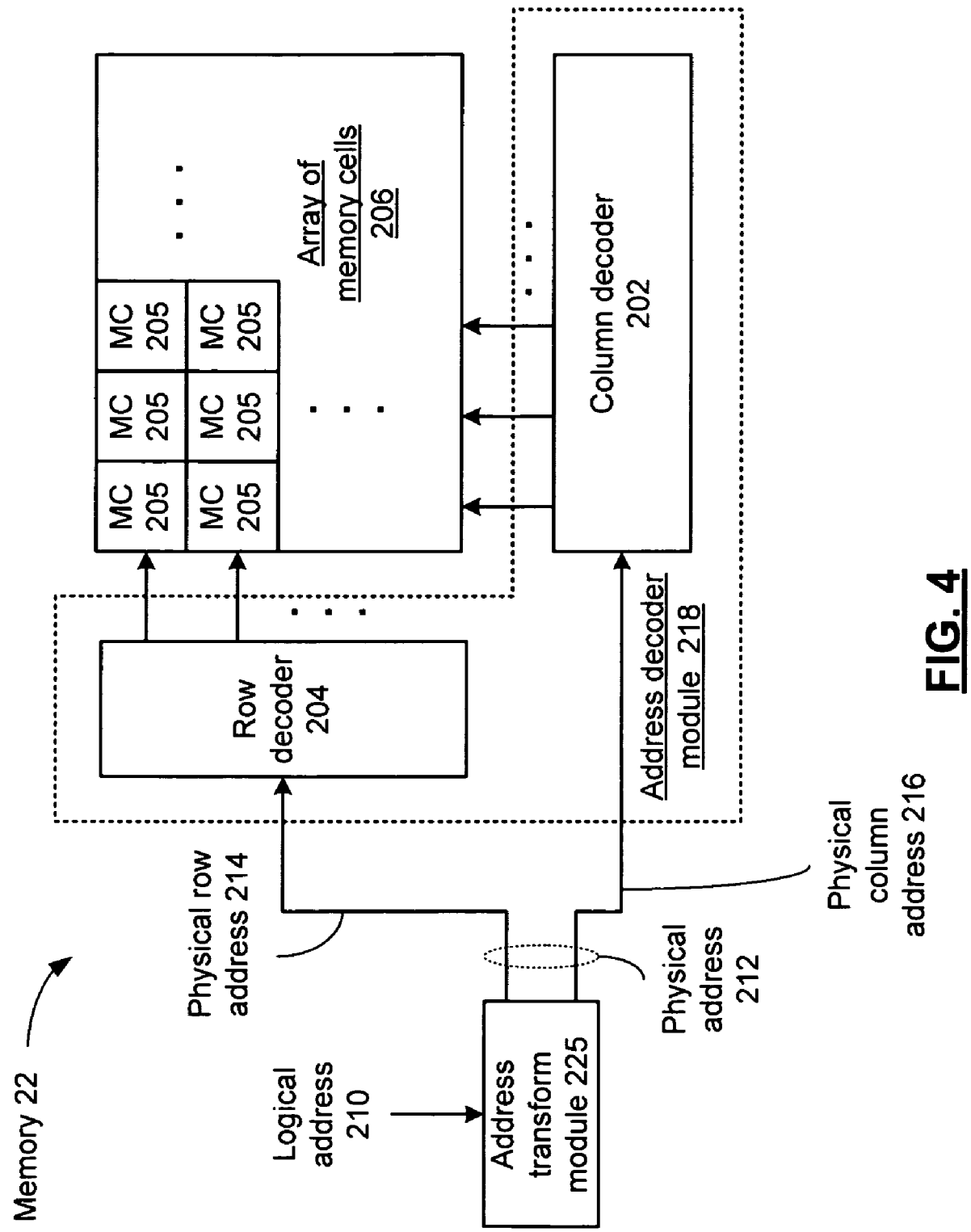
FIG. 4 presents a block diagram representation of a memory in accordance with an embodiment of the present invention.

FIG. 4 presents a block diagram representation of a memory in accordance with an embodiment of the present invention. In particular, memory 22 includes an array of memory cells 206 that includes individual memory cells 205 arranged in a plurality of rows and a plurality of columns. Address transform module 225 receives a logical address 210 and transforms the logical address 210 into a physical address 212 having a physical row address 214 and a physical column address 216. An address decoder module 218 is operatively coupled to the address transform module 225 and the array of memory cells 206. In an embodiment of the present invention, address decoder module 218 includes row decoder 204 and column decoder 202 for accessing any particular individual memory cell 205 of the array of memory cells 206 based on the physical address 212.

In an embodiment of the present invention, the array of memory cells 206 includes an array of one-time writable memory cells. Test of memory 22 is performed by generating a plurality of logical addresses 210 that include a plurality of logical test addresses. Address transform module 225 transforms the plurality of logical test addresses into a plurality of physical addresses 212 that are physical test addresses. A test pattern is written in a test region of the array of memory cells 206 corresponding to the plurality of physical test addresses.

In a preferred embodiment of the present invention, the plurality of logical test addresses includes a column or row of the array. Transform module 225, transforms the logical test addresses into a plurality physical test addresses that have a plurality of different row addresses and a plurality of different column addresses in the array. In this fashion, the operation of memory 22 can be tested using the same number of memory cells as testing with a single row or a single column, but with over multiple cells that use multiple column and row addresses. This has the advantage of detecting potential errors that effect only a column or row that would not have been otherwise tested, such as a defect in row decoder 204, column decoder 202, or localized defects in array of memory cells 206, etc.

If the memory cell passes the test, such as when the test pattern is successfully written and read from memory 22, the memory can then be programmed by writing a plurality of operational instructions in a program region of the array of memory cells 206 and/or by writing a plurality of data in a data region of the array. In an embodiment of the present invention, the transform performed by address transform module 225 is a one-to-one transform of possible logical addresses 210, onto the space of possible physical addresses 212. Each logical address 210 corresponds to one and only one physical address 212. In this fashion, the program region and data region can be written to not intersect the test region (that has already been burned) by avoiding the logical addresses corresponding to the logical test addresses.

If for instance, in an array of 256×256 memory cells 205, the logical test addresses corresponded to a single column having a logical column address of 0000 0000, the memory 22 can be programmed using a group of memory addresses that avoids the use of the logical column address 0000 0000. Likewise, in an array of 256×256 memory cells 205, if the logical test addresses corresponded to a single row having a logical row address of 0010 1010, the memory 22 can be programmed using a group of memory addresses that avoids the use of the logical row address of 0010 1010. As long as each logical address 210 corresponds to one and only one physical address 212, the memory 22 can be accessed based on logical addressing in the same fashion that a traditional memory would be accessed, regardless of the particular transform employed.

It should be noted that, based on the particular transform employed, a contiguous block of memory cells in the logical address space may or may not correspond to a contiguous block of data cells in the a contiguous block of memory cells 205 when addressed with physical addresses 212. While the advantages of the present invention have been described above in terms of the use of address transform module 225 in an array of memory cells 206 in a non-volatile memory, other applications of memory 22 can take advantage of potential spatial interleaving and/or spatial diversity created by address transform module 225. Alternative embodiments of the present invention include applications such as fault tolerant computing and storage applications with enhanced error detection and error correction, that can be implemented in flash memories, buffer memories, and other applications of dynamic and static RAM.

Figure 5:
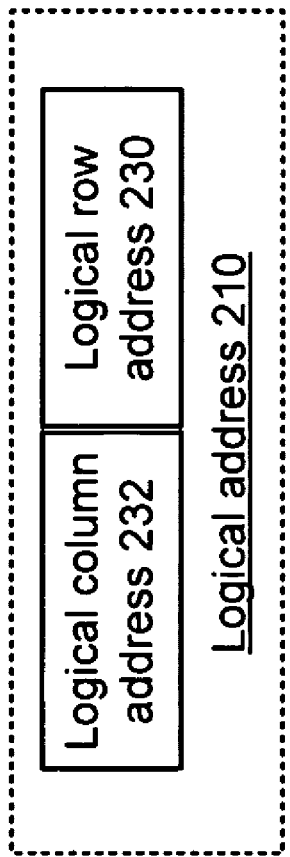
FIG. 5 presents a block diagram representation of a logical address in accordance with an embodiment of the present invention.

FIG. 5 presents a block diagram representation of a logical address in accordance with an embodiment of the present invention. In particular, a logical address 210 is shown that includes a logical column address 232 and a logical row address 230. In an embodiment of the present invention, the logical address 210 includes a plurality of binary bits including a group of most significant bits that contain either the logical column address 232 or the logical row address 230 and a group of least significant bits that contain either the logical column address 232 or the logical row address 230, whichever is not contained in the most significant bits.

Figure 6:
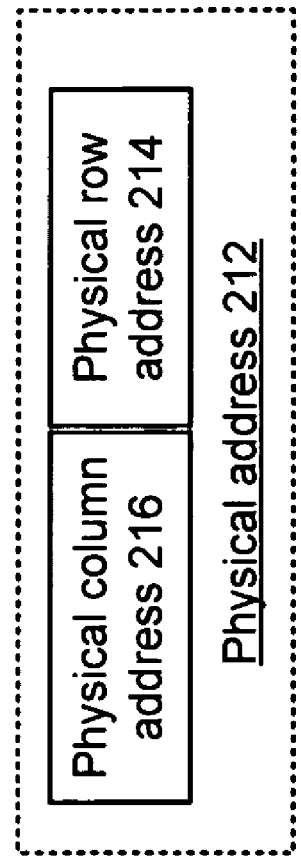
FIG. 6 presents a block diagram representation of a physical address in accordance with an embodiment of the present invention.

FIG. 6 presents a block diagram representation of a physical address in accordance with an embodiment of the present invention. In particular, physical address 212 includes physical row address 214 and physical column address 212 stored in a fashion similar to the logical address 210 described in conjunction with FIG. 5.

Figure 7:
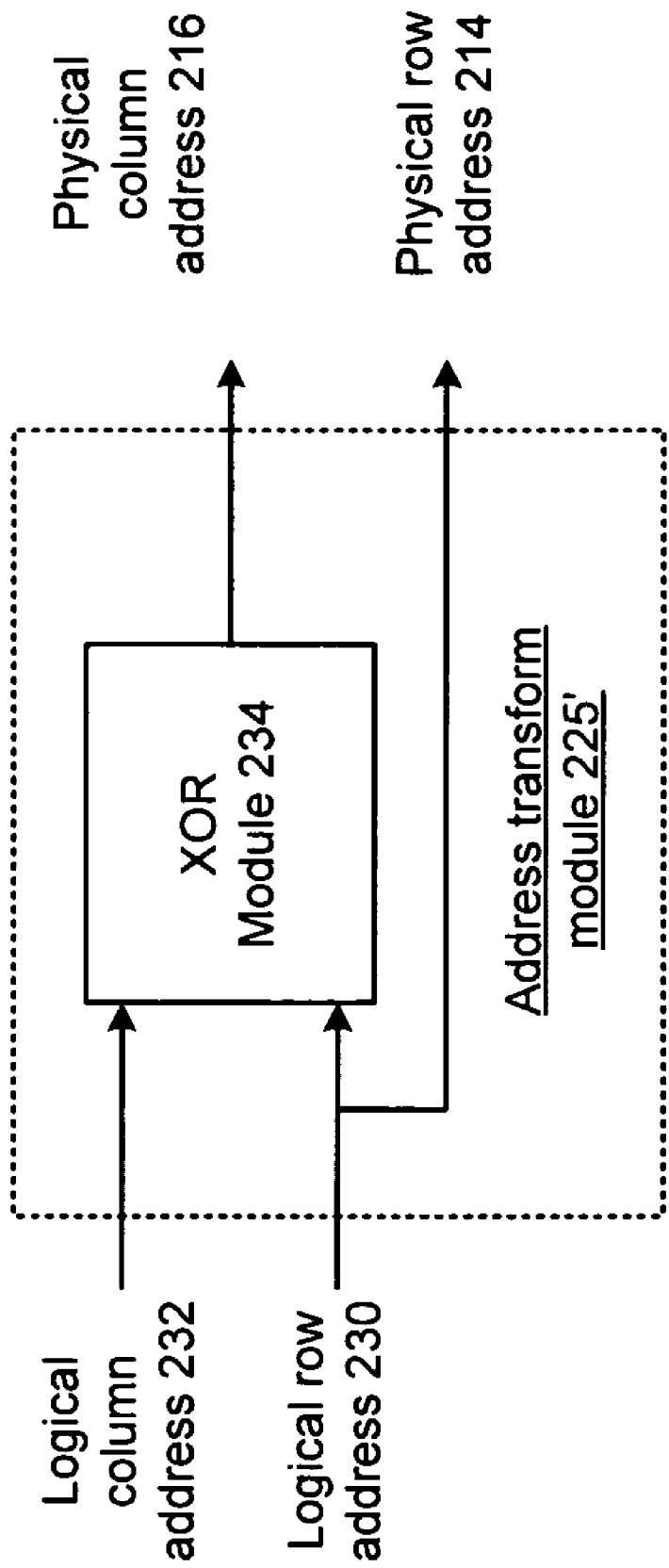
FIG. 7 presents a block diagram representation of an address transform module in accordance with an embodiment of the present invention.

FIG. 7 presents a block diagram representation of an address transform module in accordance with an embodiment of the present invention. Address transform module 225', a particular embodiment of address transform module 225, generates the physical column address 216 and the physical row address 214 of physical address 212 based on an exclusive-or of the logical row address 230 and the logical column address 232. In particular, address transform module 225 includes exclusive-or module (XOR) 234 that calculates the physical column address 216 based on exclusive-or of the logical row address 230 and the logical column address 232. In this instance, the logical row address 230 is used as the physical row address 214.

Figure 8:
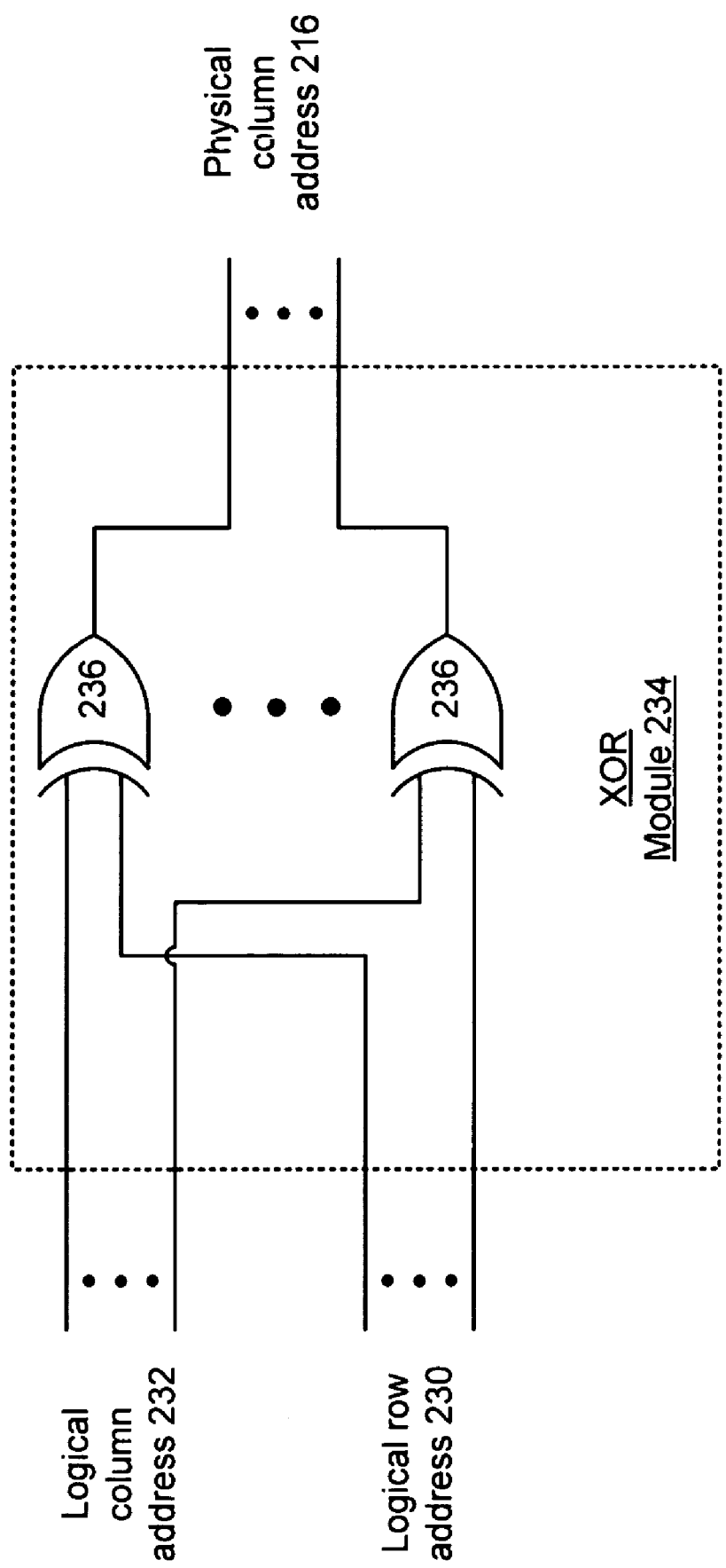
FIG. 8 presents a schematic diagram representation of an exclusive-or module in accordance with an embodiment of the present invention.

FIG. 8 presents a schematic diagram representation of an exclusive-or module in accordance with an embodiment of the present invention. In particular, XOR module 234 is implemented with a plurality of XOR gates 236 that generate the physical column address 216 by XORing the logical column address 232 and the logical row address 230 on a bit-by-bit basis.

FIG. 9 presents a pictorial diagram representation of the translation of a column of physical addresses to corresponding logical addresses in accordance with an embodiment of the present invention. The address transform module 225' of FIG. 7 is applied to an example array of 8×8 elements. While most applications of the present invention would employ larger memory arrays, the 8×8 array is shown for the purposes of illustration.

In particular, address transform module 225' is operable to transform a plurality of logical addresses 222 having a single logical column address into a plurality of physical addresses 220 having a plurality of different physical column addresses. Further, the plurality of physical addresses 220 correspond to a plurality of individual memory cells along a diagonal 223 of the array.

FIG. 10 presents a pictorial diagram representation of the translation of a column of physical addresses to corresponding logical addresses in accordance with an embodiment of the present invention. Again, the address transform module 225' of FIG. 7 is applied to an example array of 8×8 elements. Address transform module 225 is operable to transform a plurality of logical addresses 226 having another single logical column address into a plurality of physical addresses 224 having a plurality of different physical column addresses. Further, the plurality of physical addresses 224 correspond to a plurality of individual memory cells along diagonals 227 of the array.

In both of the examples set forth in FIG. 9 and FIG. 10, the address transform module 225' is operable to transform a plurality of logical addresses (222 and 226) having N different logical row addresses to a plurality of physical addresses (220 and 224) having N different physical column addresses. Further, in both cases, the plurality of physical addresses (220 and 224) have N different physical row addresses. Further, when the logical address (222 or 226) correspond to logical test addresses during a test of memory 22, the resulting test region includes a diagonal, such as diagonal 223, or diagonals 227 of the array.

Figure 11:
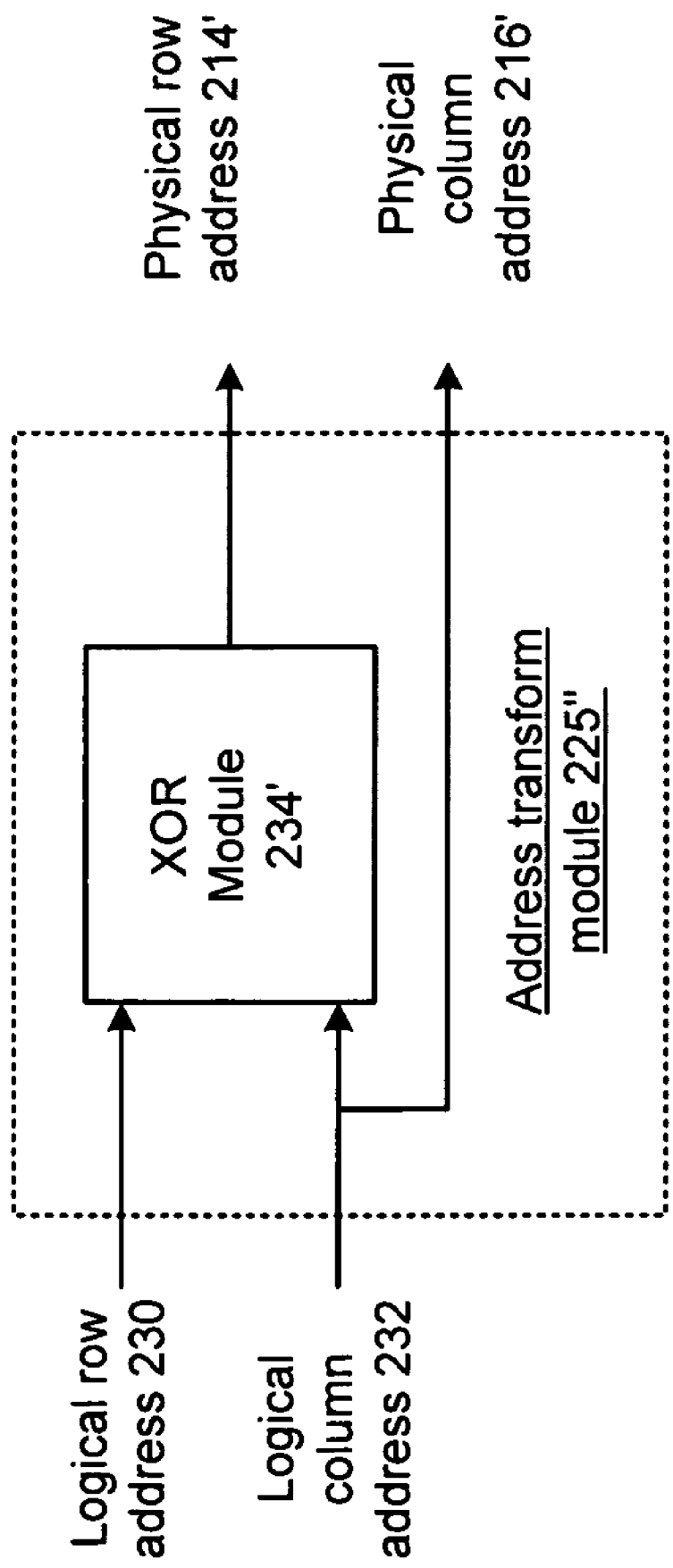
FIG. 11 presents a block diagram representation of an address transform module in accordance with an embodiment of the present invention.

FIG. 11 presents a block diagram representation of an address transform module in accordance with an embodiment of the present invention. Address transform module 225", a particular embodiment of address transform module 225, generates the physical column address 216' and the physical row address 214' of physical address 212' based on an exclusive-or of the logical row address 230 and the logical column address 232. In particular, address transform module 225" includes exclusive-or (XOR) module 234' that calculates the physical row address 214' based on exclusive-or of the logical row address 230 and the logical column address 232. In this instance, the logical column address 232 is used as the physical column address 216'.

Figure 12:
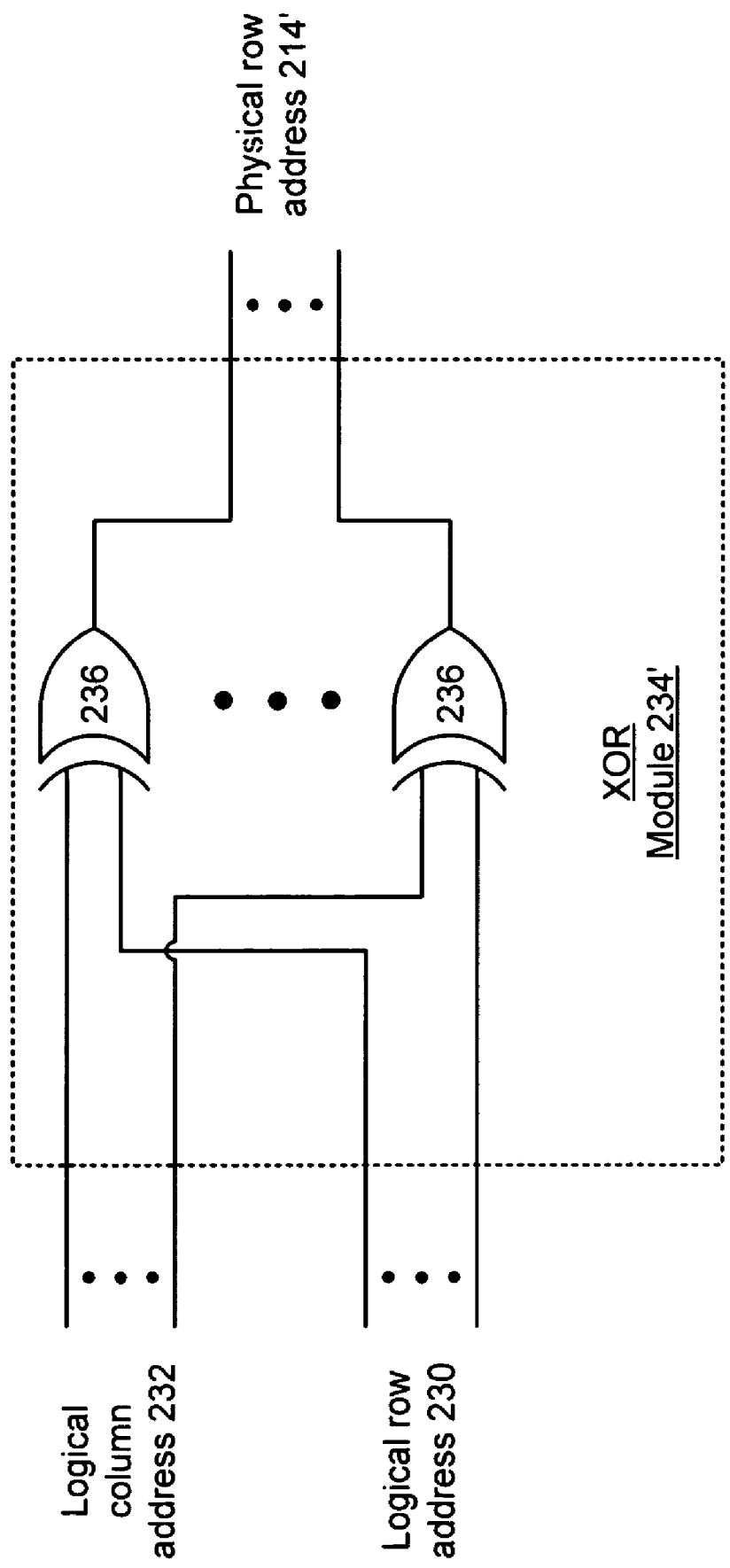
FIG. 12 presents a schematic diagram representation of an exclusive-or module in accordance with an embodiment of the present invention.

FIG. 12 presents a schematic diagram representation of an exclusive-or module in accordance with an embodiment of the present invention. In particular, XOR module 234' is implemented with a plurality of XOR gates 236 that generate the physical row address 214' by XORing the logical column address 232 and the logical row address 230 on a bit-by-bit basis.

FIG. 13 presents a pictorial diagram representation of the translation of a row of physical addresses to corresponding logical addresses in accordance with an embodiment of the present invention. The address transform module 225" of FIG. 11 is applied to an example array of 8×8 elements. While most applications of the present invention would employ larger memory arrays, the 8×8 array is shown for the purposes of illustration.

In particular, address transform module 225" is operable to transform a plurality of logical addresses 242 having a single logical row address into a plurality of physical addresses 240 having a plurality of different physical row addresses. Further, the plurality of physical addresses 240 correspond to a plurality of individual memory cells along a diagonal 241 of the array.

FIG. 14 presents a pictorial diagram representation of the translation of a row of physical addresses to corresponding logical addresses in accordance with an embodiment of the present invention. Again, the address transform module 225" of FIG. 11 is applied to an example array of 8×8 elements. Address transform module 225' is operable to transform a plurality of logical addresses 246 having another single logical row address into a plurality of physical addresses 244 having a plurality of different physical row addresses. Further, the plurality of physical addresses 244 correspond to a plurality of individual memory cells along diagonals 245 of the array.

In both of the examples set forth in FIG. 13 and FIG. 14, the address transform module 225' is operable to transform a plurality of logical addresses (242 and 246) having N different logical column addresses to a plurality of physical addresses (240 and 244) having N different physical row addresses. Further, in both cases, the plurality of physical addresses (240 and 244) have N different physical column addresses. Further, when the logical address (242 or 246) correspond to logical test addresses during a test of memory 22, the resulting test region includes a diagonal, such as diagonal 241, or diagonals 245 of the array.

Figure 15:
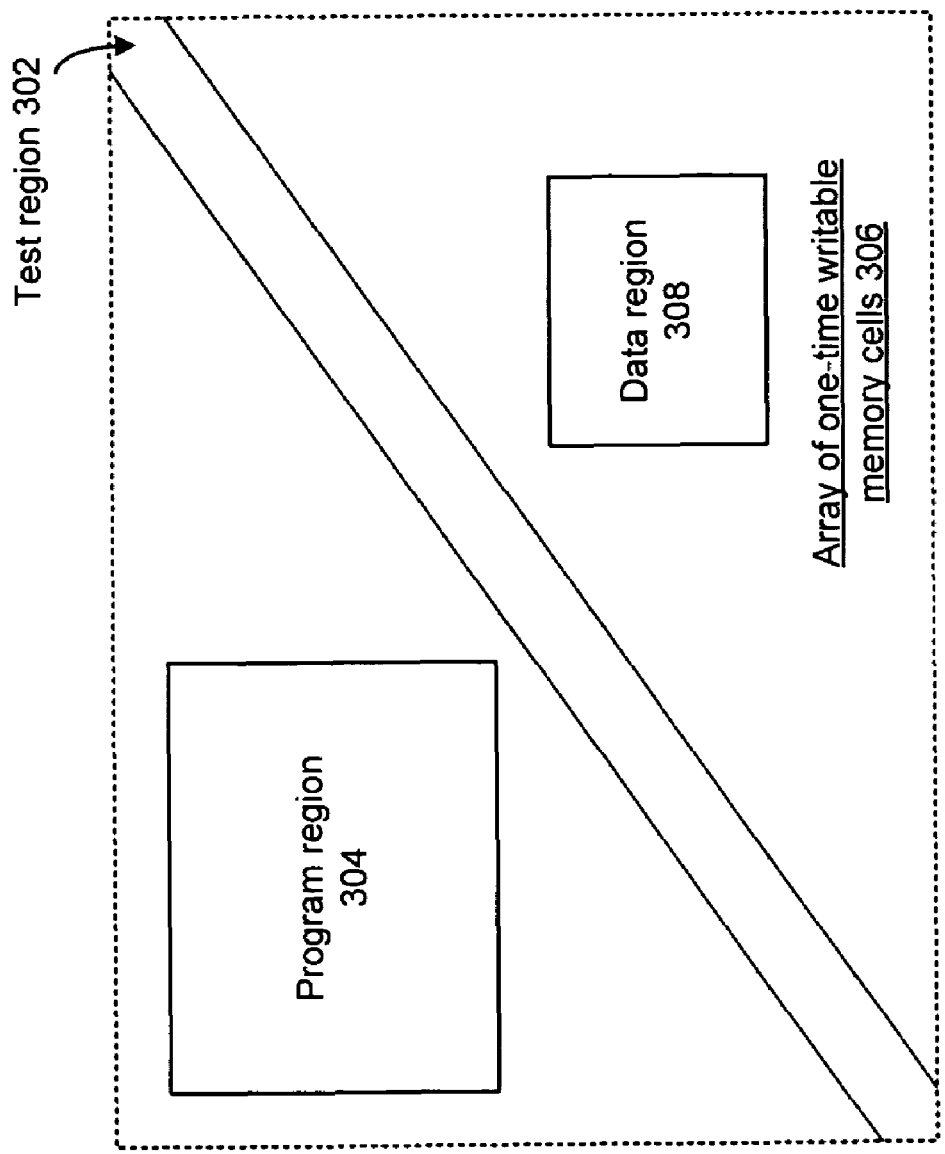
FIG. 15 presents a pictorial diagram representation of am array of one-time writable memory cells in accordance with an embodiment of the present invention.

FIG. 15 presents a pictorial diagram representation of an array of one-time writable memory cells in accordance with an embodiment of the present invention. In particular an array of one-time writeable memory cells 306 is shown with a test region 302 along at least one diagonal of the array in physical address space. The array of one-time writeable memory cells 306 further includes optional program region 304 and optional data region 308 that do not intersect the test region 302. While data region 308 and program region 304 are shown as contiguous blocks in physical address space, the application of a particular address transform module, such as 225, 225' or 225" could likewise result in test region 204 and/or data region 308 being non-contiguously stored in physical address space.

Figure 16:
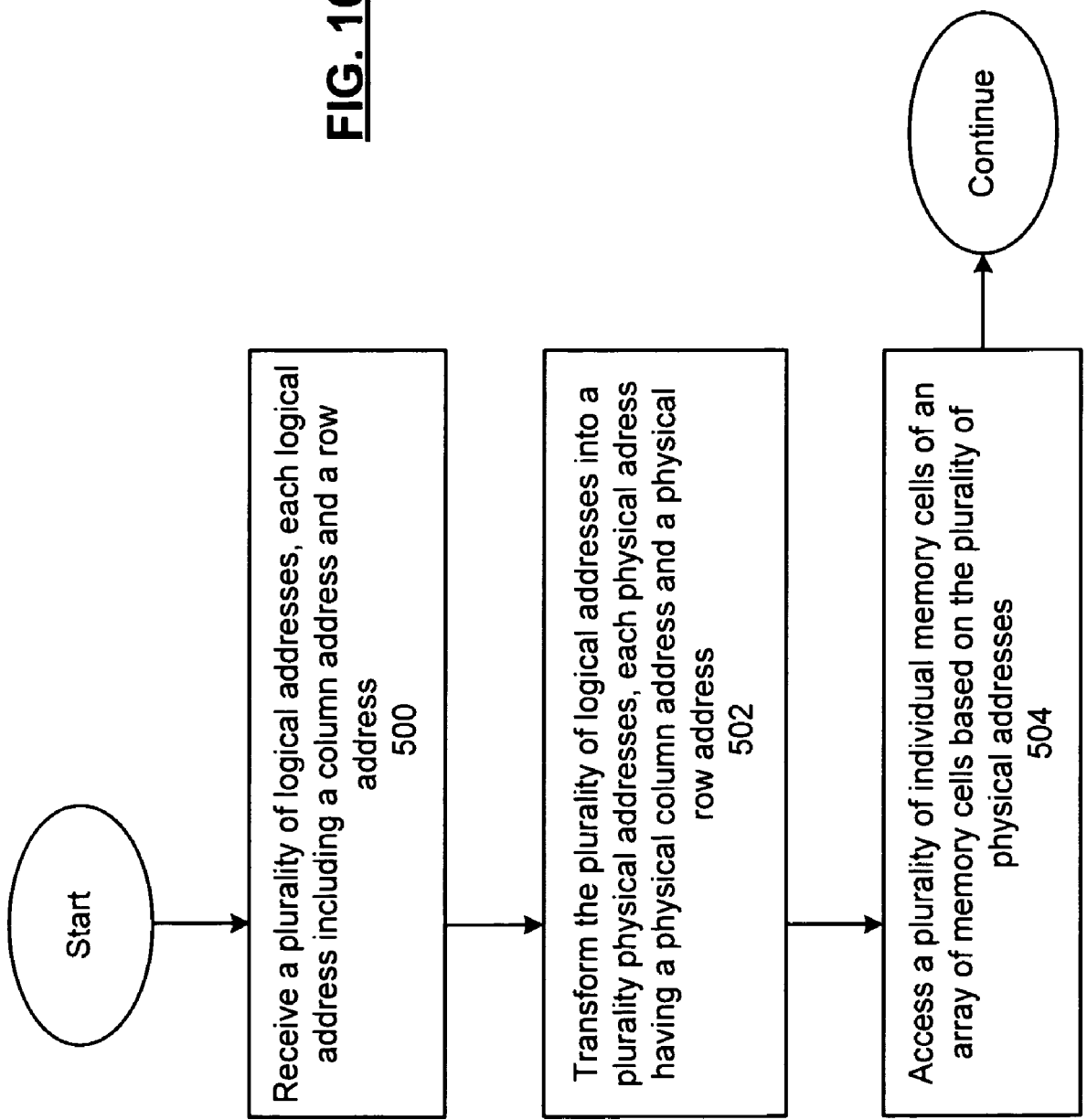
FIG. 16 presents a flowchart representation of a method in accordance with an embodiment of the present invention.

FIG. 16 presents a flowchart representation of a method in accordance with an embodiment of the present invention. In particular, a method is presented for use with one or more of the features and functions described in association with FIGS. 1-15. In step 500, a plurality of logical addresses are received, each of the plurality of logical addresses including a logical column address and logical row address. In step 502, the plurality of logical addresses are transformed into a plurality of physical addresses including a physical column address and a physical row address. In step 506, a plurality of individual memory cells of an array of memory cells are accessed, such as a by write operations and/or read operations, based on the plurality of physical addresses.

In an embodiment of the present invention, step 502 includes transforming a plurality of logical addresses having a single logical column address into a plurality of physical addresses having a plurality of different physical column addresses. Further, the plurality of physical addresses correspond to a plurality of individual memory cells along a diagonal of the array of memory cells. In an embodiment, step 502 includes transforming a plurality of logical addresses having N different logical row addresses to a plurality of physical addresses having N different physical column addresses, wherein the plurality of physical addresses have N different physical row addresses.

In an embodiment of the present invention, step 502 includes transforming a plurality of logical addresses having a single logical row address into a plurality of physical addresses having a plurality of different physical row addresses. Further, the plurality of physical addresses correspond to a plurality of individual memory cells along a diagonal of the array of memory cells. In an embodiment, step 502 includes transforming a plurality of logical addresses having N different logical column addresses to a plurality of physical addresses having N different physical row addresses, wherein the plurality of physical addresses have N different column addresses.

In an embodiment of the present invention, step 502 includes generating the physical address based on an exclusive-or of the logical row address and the logical column address. Further, the physical row address includes the exclusive-or of the logical row address and the logical column address. In addition, the physical column address includes the exclusive-or of the logical row address and the logical column address.

Figure 17:
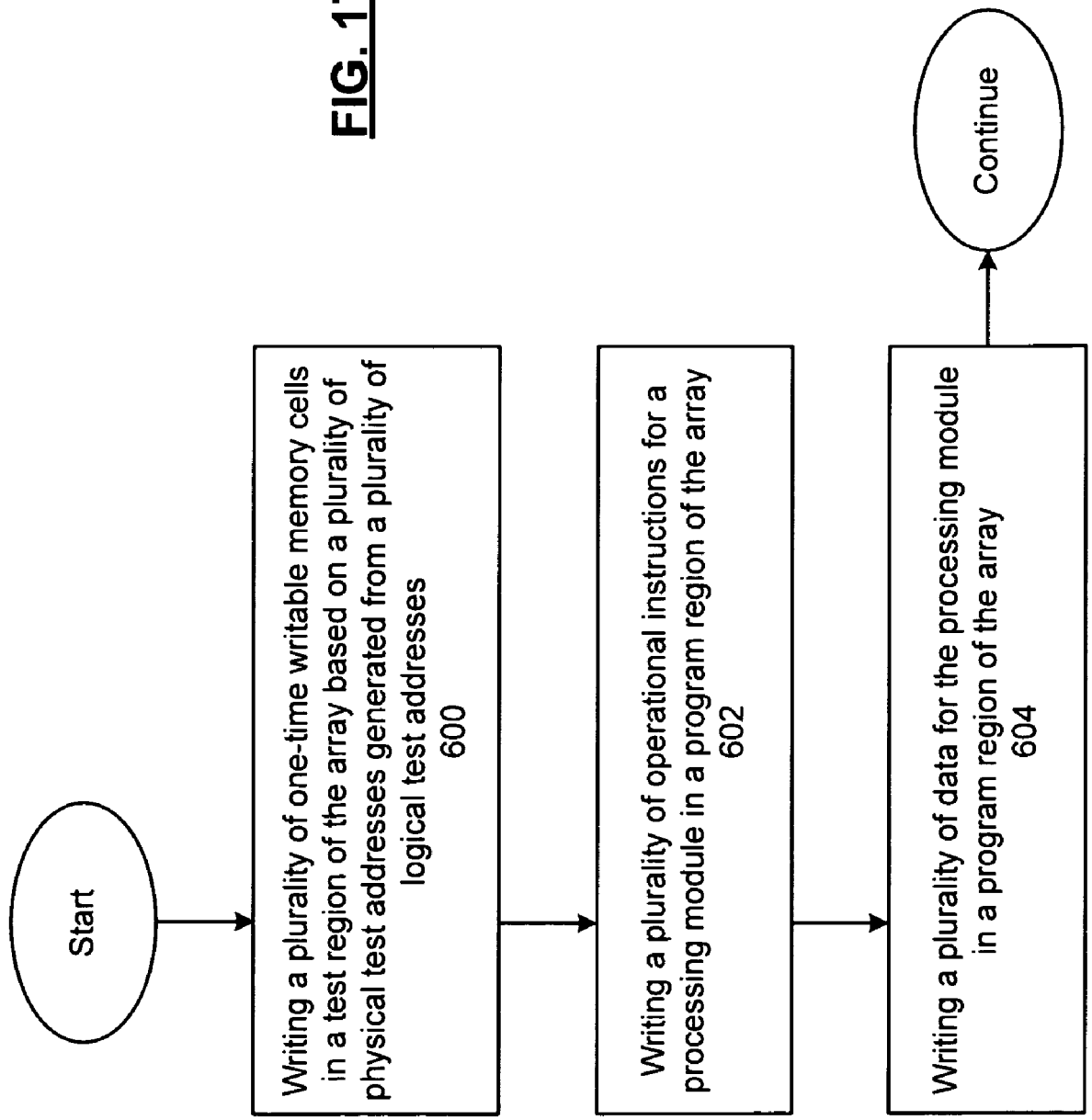
FIG. 17 presents a flowchart representation of a method in accordance with an embodiment of the present invention.

FIG. 17 presents a flowchart representation of a method in accordance with an embodiment of the present invention. A method is presented for use with one or more embodiments discussed in conjunction with FIG. 16. In addition, the method is used in an embodiment wherein the plurality of logical addresses include a plurality of logical test addresses and step 502 transforms the plurality of logical test addresses into a plurality of physical test addresses, and wherein the memory cells are one-time writable memory cells.

In step 600, a plurality of individual memory cells of the array of one-time writable memory cells are written in a test region of the array based on the plurality of physical test addresses. In step 602, a plurality of operational instructions for a processing module are written in a program region of the array of one-time writable memory cells, wherein the program region does not intersect the test region. In step 604, a plurality of data for a processing module are written in a data region of the array of one-time writable memory cells, wherein the data region does not intersect the test region.

In an embodiment of the present invention, the plurality of one-time writable memory cells in the test region include a diagonal of the array. Further, the plurality physical test addresses have a plurality of different row addresses and a plurality of different column addresses.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. The various circuits and methods consume less power and that can be easily and efficiently implemented in various integrated circuit designs. It should also be noted that the software implementations of the present invention -can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a memory and a processing system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A processing system comprising:
   an array of one-time writable memory cells arranged in a plurality of rows and a plurality of columns for storing a plurality of operational instructions in a program region of the array, and wherein the array includes a test region;
   an address transform module comprising a plurality of exclusive-or gates, the address transform module for receiving a logical address including a logical column address and a logical row address, and for transforming the logical address into a physical address having a physical row address and a physical column address based in an exclusive-or of the logical row address and the logical column address;
   an address decoder module, operatively coupled to the address transform module and the array of memory cells, for accessing an individual memory cell of the array of memory cells based on the physical address; and
   a processing module for executing the plurality of operational instructions.

2. The processing system of claim 1 wherein the address transform module is operable to transform a plurality of logical addresses having a single logical column address into a plurality of physical addresses having a plurality of different physical column addresses.

3. The processing system of claim 2 wherein the plurality of physical addresses correspond to a plurality of individual memory cells along a diagonal of the array of memory cells.

4. The processing system of claim 1 wherein the address transform module is operable to transform a plurality of logical addresses having N different logical row addresses to a plurality of physical addresses having N different physical column addresses.

5. The processing system of claim 4 wherein the plurality of physical addresses have N different physical row addresses.

6. The processing system of claim 1 wherein the address transform module is operable to transform a plurality of logical addresses having a single logical row address into a plurality of physical addresses having a plurality of different physical row addresses.

7. The processing system of claim 6 wherein the plurality of physical addresses correspond to a plurality of individual memory cells along a diagonal of the array of memory cells.

8. The processing system of claim 1 wherein the address transform module is operable to transform a plurality of logical addresses having N different logical column addresses to a plurality of physical addresses having N different physical row addresses.

9. The processing system of claim 8 wherein the plurality of physical addresses have N different column addresses.

10. The processing system of claim 1 wherein the physical row address includes the exclusive-or of the logical row address and the logical column address.

11. The processing system of claim 1 wherein the physical column address includes the exclusive-or of the logical row address and the logical column address.

12. The processing system of claim 1 wherein the test region includes a diagonal of the array.

13. The processing system of claim 1 wherein the test region corresponds to a plurality physical addresses having a plurality of different physical row addresses and a plurality of different physical column addresses.

14. A memory comprising: an array of memory cells arranged in a plurality of rows and a plurality of columns; an address transform including a plurality of exclusive-or gates wherein the address transformation module for receiving a logical address including a logical column address and logical row address, and for transforming the logical address into a physical address having a physical row address and a physical column address; wherein the address transform module generates a physical address based on an exclusive-or of a logical row address of a corresponding logical address and a logical column address of the corresponding logical address; and an address decoder module, operatively coupled to the address transform module and the array of memory cells, for accessing an individual memory cell of the array of memory cells based on a physical address of the plurality of physical addresses.

15. The memory of claim 14 wherein the address transform module is operable to transform a plurality of logical addresses having a single logical column address into a plurality of physical addresses having a plurality of different physical column addresses.

16. The memory of claim 15 wherein the plurality of physical addresses correspond to a plurality of individual memory cells along a diagonal of the array of memory cells.

17. The memory of claim 14 wherein the address transform module is operable to transform a plurality of logical addresses having N different logical row addresses to a plurality of physical addresses having N different physical column addresses.

18. The memory of claim 17 wherein the plurality of physical addresses have N different physical row addresses.

19. The memory of claim 14 wherein the address transform module is operable to transform a plurality of logical addresses having a single logical row address into a plurality of physical addresses having a plurality of different physical row addresses.

20. The memory of claim 19 wherein the plurality of physical addresses correspond to a plurality of individual memory cells along a diagonal of the array of memory cells.

21. The memory of claim 14 wherein the address transform module is operable to transform a plurality of logical addresses having N different logical column addresses to a plurality of physical addresses having N different logical row addresses.

22. The memory of claim 21 wherein the plurality of physical addresses have N different physical column addresses.

23. The memory of claim 14 wherein the physical row address includes the exclusive-or of the logical row address and the logical column address.

24. The memory of claim 14 wherein the physical column address includes the exclusive-or of the logical row address and the logical column address.

25. The memory of claim 14 wherein the array of memory cells includes an array of one-time writable memory cells.

26. The memory of claim 14 wherein a plurality of one-time writable memory cells in a test region.

27. The memory of claim 14 wherein the plurality of one-time writable memory cells in the test region include a diagonal of the array.

28. The memory of claim 14 wherein the plurality of one-time writable memory cells in the test region correspond to a plurality physical addresses having a plurality of different physical row addresses and a plurality of different physical column addresses.

29. A method comprising:
   receiving a plurality of logical addresses, each of the plurality of logical addresses including a logical column address and logical row address;
   transforming the plurality of logical addresses into a plurality of physical addresses including a physical column address and a physical row address, each physical address being generated based in an exclusive-or of a corresponding logical row address and a corresponding logical column address; and accessing a plurality of individual memory cells of an array of memory cells based on the plurality of physical addresses.

30. The method of claim 29 wherein the step of transforming includes transforming a plurality of logical addresses having a single logical column address into a plurality of physical addresses having a plurality of different physical column addresses.

31. The method of claim 30 wherein the plurality of physical addresses correspond to a plurality of individual memory cells along a diagonal of the array of memory cells.

32. The method of claim 29 wherein the step of transforming includes transforming a plurality of logical addresses having N different logical row addresses to a plurality of physical addresses having N different physical column addresses.

33. The method of claim 32 wherein the plurality of physical addresses have N different physical row addresses.

34. The method of claim 29 wherein the step of transforming includes transforming a plurality of logical addresses having a single logical row address into a plurality of physical addresses having a plurality of different physical row addresses.

35. The method of claim 34 wherein the plurality of physical addresses correspond to a plurality of individual memory cells along a diagonal of the array of memory cells.

36. The method of claim 29 wherein the step of transforming includes transforming a plurality of logical addresses having N different logical column addresses to a plurality of physical addresses having N different physical row addresses.

37. The method of claim 36 wherein the plurality of physical addresses have N different column addresses.

38. The method of claim 29 wherein the physical column address includes the exclusive-or of the logical row address and the logical column address.

39. The method of claim 29 wherein the plurality of logical addresses include a plurality of logical test addresses and the step of transforming transforms the plurality of logical test addresses into a plurality of physical test addresses, and wherein the memory cells are one-time writable memory cells, the method further comprising:

writing a plurality of individual memory cells of the array of one-time writable memory cells in a test region of the array based on the plurality of physical test addresses.

40. The method of claim 39 wherein the plurality of one-time writable memory cells in the test region include a diagonal of the array.

41. The method of claim 39 wherein the plurality physical test addresses have a plurality of different row addresses and a plurality of different column addresses.

42. The method of claim 39 further comprising the step of:

writing a plurality of operational instructions for a processing module in a program region of the array of one-time writable memory cells;

wherein the program region does not intersect the test region.

43. The method of claim 39 further comprising the step of:

writing a plurality of data for a processing module in a data region of the array of one-time writable memory cells;

wherein the data region does not intersect the test region.

* * * * *